United States Patent
Hwang et al.

(10) Patent No.: US 10,469,657 B1
(45) Date of Patent: *Nov. 5, 2019

(54) REDUNDANCY FOR BACK-END FAILURE (71) Applicant: Vivint, Inc., Provo, UT (US)

(72) Inventors: Jungtaik Hwang, Draper, UT (US);
Matthew J. Eyring, Provo, UT (US);
Jeremy Bruce Warren, Draper, UT (US); James Ellis Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/959,208

(22) Filed: Apr. 21, 2018

Related U.S. Application Data (63) Continuation of application No. 14/561,644, filed on Dec. 5, 2014, now Pat. No. 9,973,626.

(60) Provisional application No. 61/912,979, filed on Dec. 6, 2013.

(51) Int. Cl.
*H04M 3/42* (2006.01)
*H04M 3/51* (2006.01)
*G08B 25/00* (2006.01)

(52) U.S. Cl.
CPC ...... *H04M 3/42042* (2013.01); *G08B 25/004* (2013.01); *H04M 3/42059* (2013.01); *H04M 3/51* (2013.01)

(58) Field of Classification Search
CPC ............ H04M 3/42042; H04M 3/51; H04M 3/42059; G08B 25/004
See application file for complete search history.

(56) References Cited

U.S. PATENT DOCUMENTS

| | | | |
|---|---|---|---|
| 5,278,539 A | 1/1994 | Lauterbach et al. | |
| 8,405,499 B2 | 3/2013 | Hicks | |
| 8,976,937 B2 | 3/2015 | Shapiro et al. | |
| 9,973,626 B2 * | 5/2018 | Hwang | H04M 3/42042 |
| 2009/0274104 A1 | 11/2009 | Addy | |
| 2010/0226259 A1 * | 9/2010 | Desmond | H04L 1/1803 370/242 |

* cited by examiner

*Primary Examiner* — Ryan W Sherwin
(74) *Attorney, Agent, or Firm* — Holland & Hart LLP (57) ABSTRACT

Methods and systems are described for back-end failure redundancy in security and automation systems. According to at least one embodiment, an apparatus for back-end failure redundancy includes a processor, a memory in electronic communication with the processor, and instructions stored in the memory. The instructions are executable by a processor to detect an alarm event, and attempt to establish a connection between a control panel and a backend system. If no connection between control panel and backend system is made, the instructions may initiate a two-way cellular call between the control panel and a central station, and deliver a caller ID from the control panel to the central station via the two-way cellular call.

20 Claims, 9 Drawing Sheets

REDUNDANCY FOR BACK-END FAILURE

CROSS REFERENCE

This application is a continuation of U.S. patent application Ser. No. 14/561,644 entitled "REDUNDANCY FOR BACK-END FAILURE," which was filed 5 Dec. 2014, which claims priority from co-pending U.S. Provisional Patent Application No. 61/912,979 entitled "REDUNDANCY FOR BACK-END FAILURE," which was filed 6 Dec. 2013, the disclosures of which are incorporated herein by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. Backup systems in the event of system failure or failure of various portions of an automation and/or security system may not be readily available.

SUMMARY

Methods and systems are described for back-end failure redundancy in security and automation systems. According to at least one embodiment, an apparatus for back-end failure redundancy includes a processor, a memory in electronic communication with the processor, and instructions stored in the memory.

The instructions are executable by a processor to detect an alarm event and attempt to establish a connection between a control panel and a backend system. If no connection between the control panel and backend system is made, the instructions may initiate a two-way cellular call between the control panel and a central station, and deliver a caller ID from the control panel to the central station via the two-way cellular call.

In one embodiment, the control panel may be located at a residence, and the control panel may include controls for a home security system. The central station may be a call center and the call center may place a separate two-way call to a designated person responsible for the control panel upon receipt of the caller ID.

The instructions may also provide dispatching emergency assistance through the central station in response to receiving the caller ID. Attempting to establish a connection between the control panel and the backend system may be performed over a network. The network may include the Internet. The control panel may include a cellular radio. The control panel may communicate with the backend system through a separate network than a network used to communication between the control panel and the central station. The instructions may be executable by a processor to perform an intervening action after the caller ID is delivered. The intervening action may include at least one of dispatching fire, police or medical assistance, or dispatch maintenance service.

In another embodiment, a computer-program product for back-end failure redundancy includes a non-transitory computer-readable medium storing instructions executable by a processor to detect an alarm event and attempt to establish a connection between a control panel and a backend system. If no connection between control panel and backend system is made, the instructions initiate direct communication between the control panel and a central station, and deliver information from the control panel to the central station via the direct communication.

In one embodiment, the direct communication includes a 2-way cellular call. The information may include a caller ID. The information may include only a caller ID.

In a further embodiment, a computer-implemented back-end failure redundancy method comprises attempting to establish a connection between a control panel and a backend system, confirming that no connection between control panel and backend system is made, initiating a two-way cellular call between the control panel and a central station, and communicating information between the control panel and the central station via the two-way cellular call.

In one embodiment, the method further includes detecting an alarm event, and the information relates to the alarm event. The alarm event may include one of detecting smoke, fire, or an intruder, or a medical emergency. Communicating information may include delivering a caller ID. The method may include confirming whether an alarm signal has been received from the backend system to the central station in connection with the control panel. The method may include accessing a database to confirm whether the information received by the central station corresponds with a control panel being monitored by the central station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to an improved communication arrangement between a control panel installed in the monitored property, a back-end communication system, and a central station. The communication arrangement provides redundancy for delivery of information (e.g., alarm information) from the control panel to the central station in the event the backend system, which is typically interposed between the control panel and central station and the sole means of communicating information from the control panel to the central station, is inaccessible by the control panel. The communication arrangement provides for bypass of the backend system when the backend system is down (e.g., unable to receive communications, such as an alarm signal, from the control panel).

Figure 1:
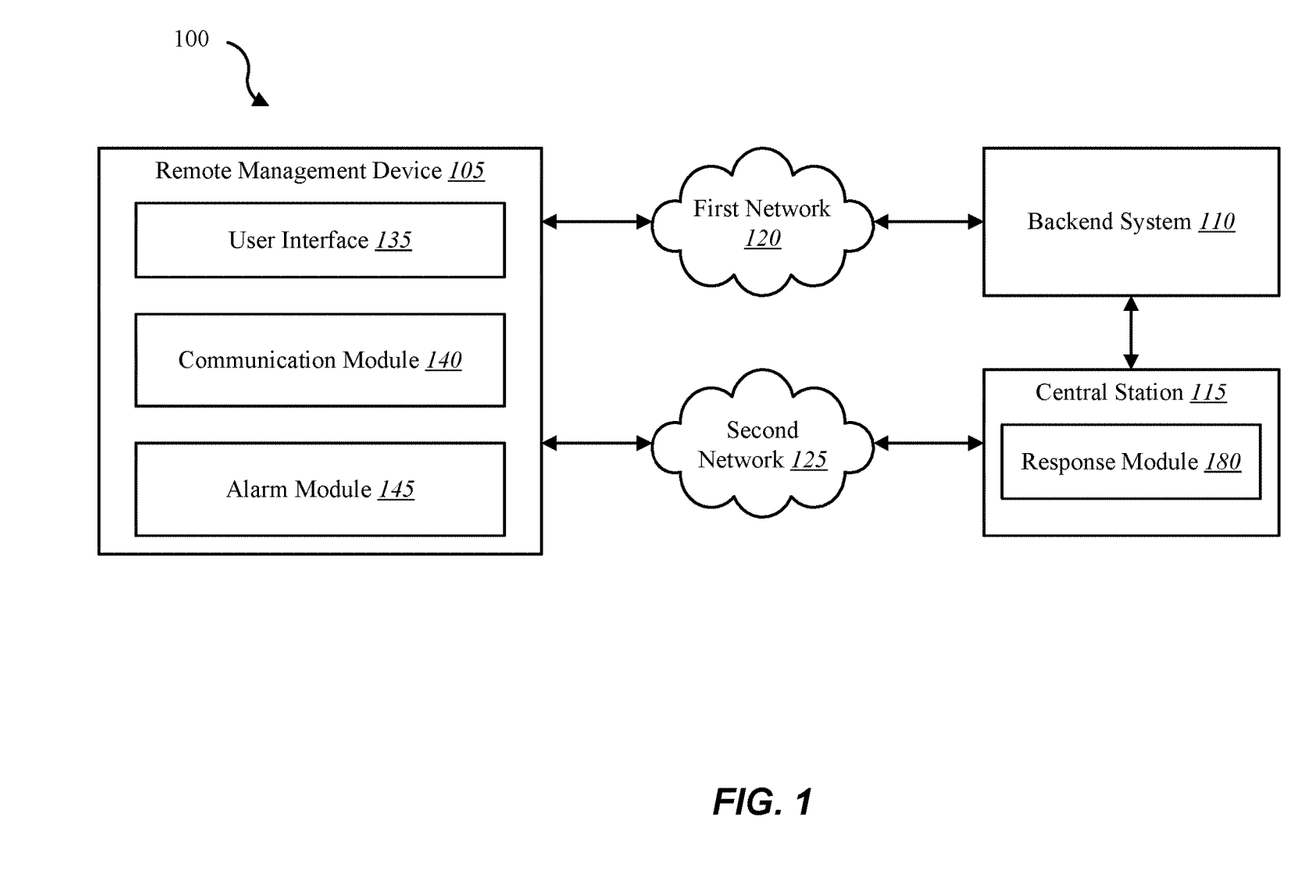
FIG. 1 is a block diagram of an environment in which the present systems and methods may be implemented.

FIG. 1 is a block diagram illustrating one embodiment of an environment 100 in which the present systems and methods may be implemented. In some embodiments, the systems and methods described herein may be performed on a remote management device 105 (e.g., a control panel). The environment 100 may include the device 105, a backend system 110, a central station 115, and first and second networks 120, 125. The first and second networks 120, 125 provide communication between at least some of the device 105, backend system 110, and central station 115.

In some embodiments, the remote management device 105 is a portable electronic device with a touch screen display. The device 105 may be in communication with one or more sensors. A sensor may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

In some configurations, device 105 may include components such as a user interface 135, a communication module 140, and an alarm module 145. Although the components of device 105 are depicted as being internal to device 105, it is understood that one or more of the components may be external to the device 105 and connect to device 105 through wired and/or wireless connections. For example, one or more components (e.g., software, firmware, and/or hardware) of communication module 140 may be located, installed, and/or part of other components and/or systems of environment 100.

In some embodiments, device 105 may communicate with backend system 110 via the first network 120. The backend system 110 may then communicate at least some of the information received from device 105 to central station 115. Alternatively, device 105 may communicate with central station 115 separately through the second network 125. Examples of networks 120, 125 include cloud networks, local area networks (LAN), wide area networks (WAN), virtual private networks (VPN), wireless networks (using 802.11, for example), and/or cellular networks (using 3G and/or LTE, for example), etc. In some embodiments, the first network 120 may include the Internet and the second network 125 may include cellular networks.

The primary communication channel between device 105 and central station 115 may include routing through backend system 110. Typically, when device 105 has information to transfer to central station 115 (e.g., information about an alarm event determined using alarm module 145), the device 105 may attempt to create a communication link with backend system 110 via communication module 140. If the communication link is available, the link is established and the information is transferred from device 105 to backend system 110 via, for example, communication module 140. The backend system 110 then transfers at least some of the information received from device 105, and potentially additional information, to central station 115.

The environment 100 may be configured to provide a redundant or backup communication system between device 105 and central station 115 in addition to the communications possible via backend system 110. The redundant communication system typically becomes active when device 105 attempts to create a communication link with backend system 110 and the link fails. The failure to create a communication link between device 105 and backend system 110 may occur for any of a number of reasons, including, for example, failures associated with the first network 120 (e.g., dysfunctional hardware, etc.) or failures associated with backend system 110 (e.g., power outage, etc.).

If the communication link is unavailable, the device 105 may create a backup communication link with central station 115 via communication module 140, and communicate information to central station 115 via the backup communication link. The backup communication link may be created by initiating, for example, a 2-way cellular call from a cellular radio of the device 105 and a cellular device at central station 115. The information transferred from device 105 to central station 115 via the backup communication link may include, for example, a caller ID or other information associated with device 105, an alarm communication (e.g., an alarm code) or information about the property location.

Once central station 115 receives the information conveyed by device 105, whether through backend system 110 or directly from device 105, central station 115 may perform any of a number of functions including, for example, initiating a separate two-way call with a designated contact person associated with device 105 or the property generally, dispatching emergency or service personnel, or some other intervening action using, for example, a response module 180.

Figure 2:
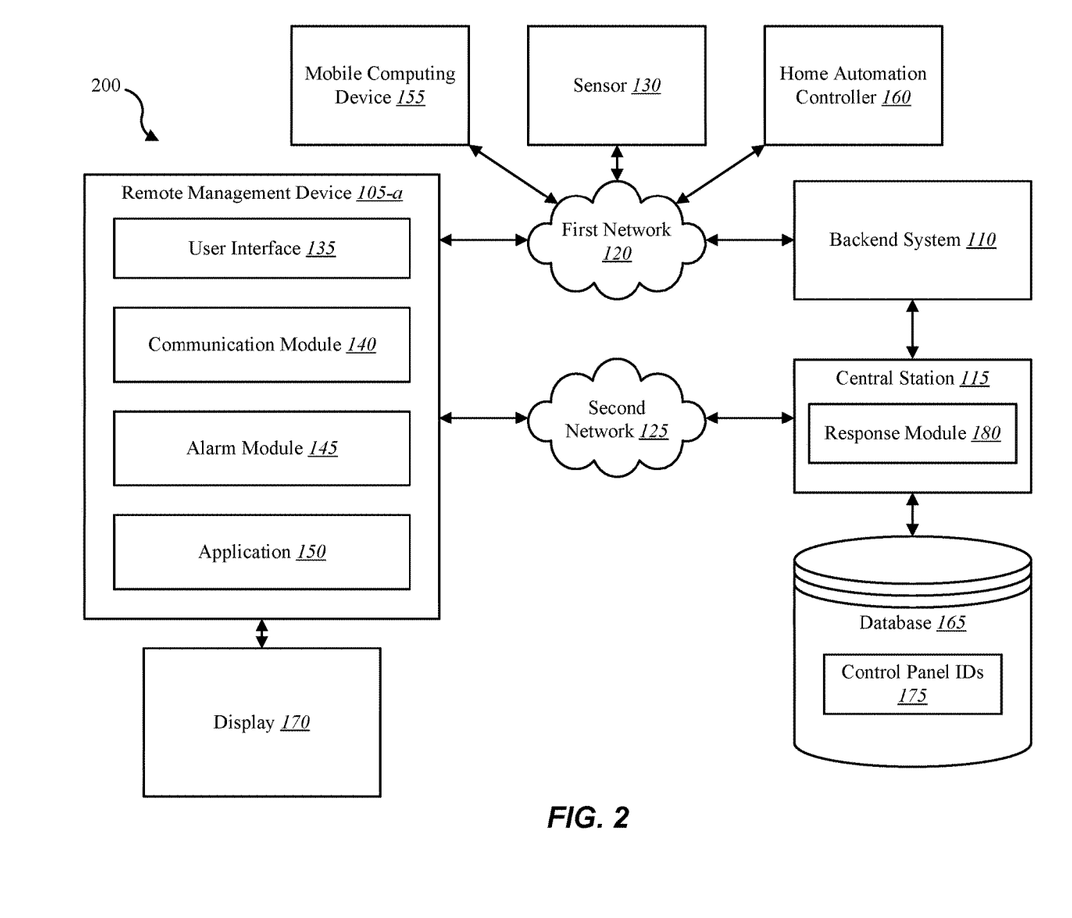
FIG. 2 is a block diagram of another environment in which the present systems and methods may be implemented.

Referring now to FIG. 2, in some embodiments, an environment 200 may include the components of environment 100 described above, and may further include a sensor 130, a mobile computing device 155, a home automation controller 160, a database 165, and a display 170. Additionally, a remote management device 105-*a* may include an application 150. The device 105-*a* may be an example of the device illustrated in FIG. 1.

Sensor 130 shown in FIG. 2 may represent one or more separate sensors or a combination of two or more sensors in a single sensor device. For example, sensor 130 may represent one or more camera sensors and one or more motion sensors connected to environment 200. Additionally, or alternatively, sensor 130 may represent a combination sensor such as both a camera sensor and a motion sensor integrated in the same sensor device. Although sensor 130 is depicted as connecting to device 105-*a* over network 120, in some embodiments, sensor 130 may connect directly to device 105-*a*. Additionally, or alternatively, sensor 130 may be integrated with a home appliance or fixture such as a light bulb fixture. Sensor 130 may include an accelerometer to enable sensor 130 to detect a movement. Sensor 130 may include a wireless communication device enabling sensor 130 to send and receive data and/or information to and from one or more devices in environment 200. Additionally, or alternatively, sensor 130 may include a GPS sensor to enable sensor 130 to track a location of sensor 130. Sensor 130 may include a proximity sensor to enable sensor to detect proximity of a person relative to a predetermined distance from a dwelling (e.g., geo-fencing). Sensor 130 may include one or more security detection sensors such as, for example, a glass break sensor, a motion detection sensor, or both. Additionally, or alternatively, sensor 130 may include a smoke detection sensor, a carbon monoxide sensor, or both.

In some embodiments, mobile computing device 155 may include a television set. Additionally, or alternatively, mobile computing device 155 may include one or more processors, one or more memory devices, and/or a storage device. Examples of mobile computing device 155 may include a viewing device associated with a media content set top box, satellite set top box, cable set top box, DVRs, personal video recorders (PVRs), and/or mobile computing devices, smart phones, personal computing devices, computers, servers, etc.

In some embodiments, a user may access the functions of device 105-*a* and/or home automation controller 160 from mobile computing device 155. For example, in some embodiments, mobile computing device 155 includes a mobile application that interfaces with one or more functions of device 105-*a*, home automation controller 160, and/or backend system 110 and central station 115.

Examples of the home automation controller 160 may include a dedicated home automation computing device (e.g., wall-mounted controller), a personal computing device (e.g., laptop, desktop, etc.), a mobile computing device (e.g., tablet computing device, smartphone, etc.), and the like.

In some embodiments, device 105-*a* may be integrated with home automation controller 160 in the form of one or more personal computing devices (e.g. mobile devices, smart phones, and/or personal computing devices) to both control aspects of a property as well as to receive and display notifications regarding monitored activity of a property.

In some embodiments, central station 115 may be coupled to database 165. Backend system 110 may be directly coupled to database 165 or may be indirectly coupled via central station 115. Database 165 may include, for example, control panel IDs associated with each device 105-*a* being monitored by backend system 110 and central station 115. Database 165 may include other information including, for example, historical information about device 105-*a* and other aspects of environment 200, contact information for various response personnel, and the like.

Application 150 may allow a user to control (either directly or via home automation controller 160) an aspect of the monitored property, including security, energy management, locking or unlocking a door, checking the status of a door, locating a person or item, controlling lighting, thermostat, cameras, receiving notification regarding a current status or anomaly associated with a home, office, place of business, and the like. In some configurations, application 150 may enable device 105-*a* to interface with home automation controller 160 and provide the user interface 135 to display automation, security, and/or energy management content on device 105-*a* and/or mobile computing device 155. Thus, application 150, via the user interface 135, may allow users to control aspects of their home, office, and/or other type of property. Further, application 150 may be installed on mobile computing device 155 in order to allow a user to interface with a function of device 105-*a*, home automation controller 160, and/or backend system 110 or central station 115.

Figure 3:
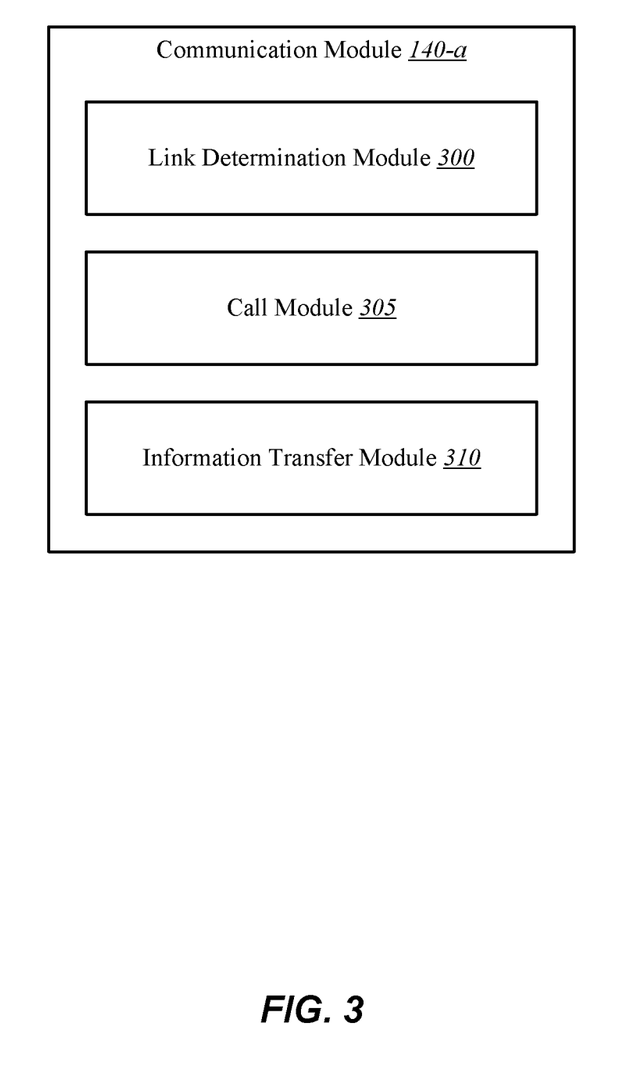
FIG. 3 is a block diagram of an example communications module of the environments shown in FIGS. 1 and 2.

FIG. 3 is a block diagram illustrating one example of a communication module 140-*a*. Communication module 140 may be one example of communication module 140 depicted in FIGS. 1 and/or 2. As depicted, communication module 140-*a* may include a link determination module 300, a call module 305, and an information transfer module 310. Communication module 140-*a* may include additional modules and capability in other embodiments. Similarly, communication module 140-*a* may include a fewer number of modules and functionality than that which is described with reference to FIG. 3.

Link determination module 300 may operate to determine whether it is possible to create a communication link between device 105 and backend system 110. Link determination module 300 may determine, for example, whether the first network 120 is available, and if it is, determine whether backend system 110 is available to create the communication link. If the communication link is available, communication module 140-*a* generates the communication link between device 105 and backend system 110 via the second network 120. Information transfer module 310 of communication module 140 may then transfer information from device 105 to backend system 110. The information may include, for example, information about an alarm event determined using alarm module 145 (see FIG. 1).

In the event that link determination module 300 determines that a communication link between device 105 and backend system 110 is not possible, call module 305 may operate to create a communication link between device 105 and central station 115. In at least one example, call module 305 initiates a two-way cellular call between device 105 and central station 115 via the second network 125. Once the communication link between device 105 and central station 115 is initiated using call module 305, information transfer module 310 may transfer information from device 105 to central station 115. The information transferred via information transfer module 310 may be dependent upon, at least in part, the type of communication link generated between device 105 and central station 115. In the case of a two-way cellular call, the information transferred may include, for example, a caller ID. Other information may include, for example, an alarm code, a residence address, or other available detail. In the case of a communication link over another type of communication medium such as the Internet, additional detail may of different types of communication links using various technologies, such as be provided in the transferred information.

The label of "call" module 305 does not necessarily limit the functionality of call module 305 to making calls in order to create a communication link between device 105 and central station 115. Other types of communication links are possible via the second network 125, and call module 305 may operate to generate any one of a number any one of the technologies discussed above related to networks 120, 125.

Figure 4:
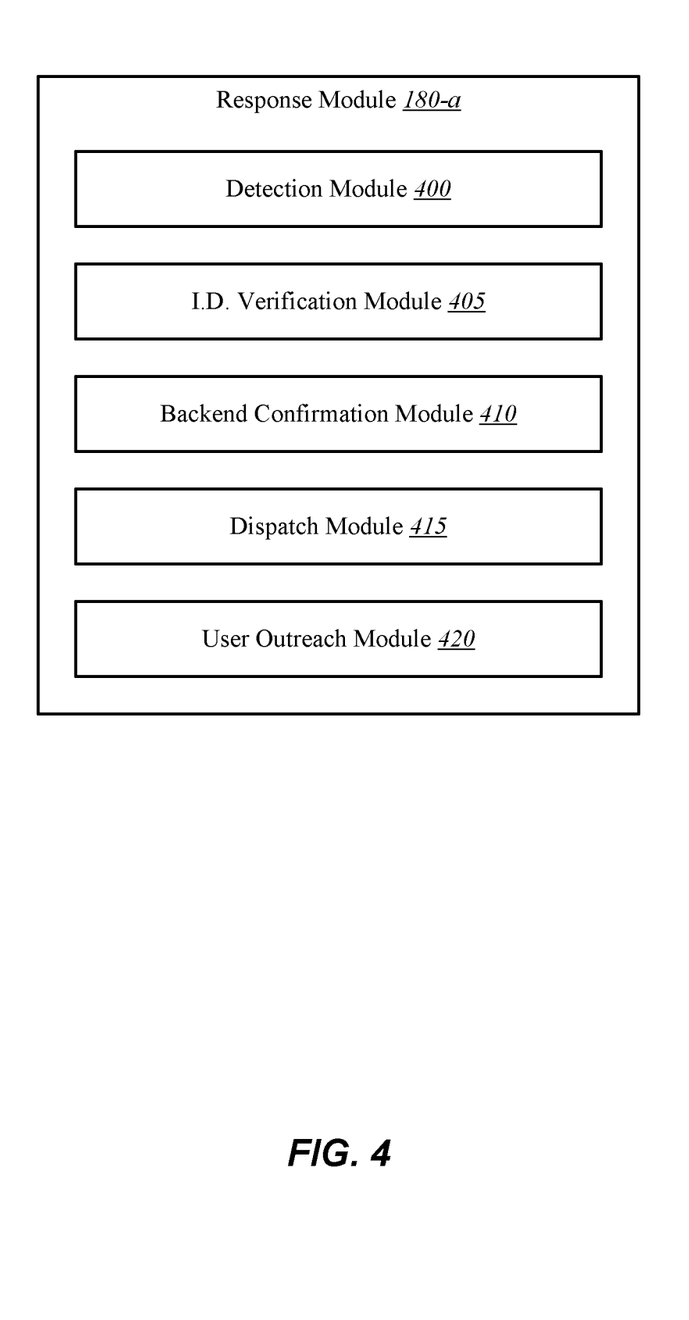
FIG. 4 is a block diagram of an example response module of the environments shown in FIGS. 1 and 2.

FIG. 4 is a block diagram illustrating one example of a response module 180-a. Response module 180-a may be one example of response module 180 depicted in FIGS. 1 and/or 2. As depicted, response module 180-a may include a detection module 400, an ID verification module 405, a backend confirmation module 410, a dispatch module 415, and a user outreach module 420.

When communications are incoming from backend system 110, response module 180-a may have a different protocol or operating procedure than when information is incoming directly from device 105 via network 125. During operation of environments 100, 200, wherein communications from device 105 are transferred through the first network 120 and backend system 110 to central station 115, detection module 400 detects a communication incoming from backend system 110, identifies a device and/or a location for the incoming information via the ID verification module 405, and then uses the dispatch module 415 and/or the user outreach module 420 to perform an intervening action. The backend confirmation module 410 may operate to confirm that the incoming information is being sent from the backend system 110 rather than from another source.

In the event of a backend failure (e.g., inability for device 105 to communicate with backend system 110), the response module 180-a may initiate a separate operating procedure. In the separate (e.g., redundant or backup) procedure, the detection module 400 detects incoming information. In at least some examples, the incoming information received from the backend system 110 is different or provided in a different format and/or communication medium from the information delivered directly from device 105 via the second network 125. In at least some arrangements, the information sent directly from device 105 via the second network 125 is unique as compared to communication from backend system 110 and immediately triggers the alternative operating procedure referenced as a backup procedure. For example, the information received by detection module 400 may be in the form of a caller ID sent via a two-way cellular call, wherein information delivered from backend system 110 does not include a caller ID or send information via a two-way cellular call.

Once the information is received by detection module 400, response module 180-a operates the ID verification module 405 to determine which device 105 and/or location at which the device 105 resides. Once the ID verification is complete, central station 115 may be able to recognize the type of system (e.g., security or automation) and its related capabilities. The backend confirmation module 410 may check to confirm that no information associated with the identified device and/or location has been received from the backend system 110. If no such information has been received from the backend system 110, response module 180-a may operate at least one of the dispatch module 415 and user outreach module 420 to perform an intervening action. For example, dispatch module 415 may operate to dispatch at least one of service personnel or police, fire, or medical personnel to the location of device 105 or its associated monitored property. In another example, user outreach module 420 may operate to attempt communication with someone associated with device 105 (e.g., a home or business owner, security guards, etc.) via, for example, a text message, a cellular call, an email, or a social media message.

In at least some examples, the information conveyed to central station 115 from device 105 through the second network 125 provides limited information. As a result, the response from the central station 115 via the user outreach module 420 may include, for example, a message that the system is receiving a non-descript emergency signal from the location of device 105 and a request for confirmation of the circumstances and events ongoing at the location of device 105 or the property being monitored by device 105. In other arrangements, additional information may be conveyed via the second network 125 that provides sufficient guidance for central station 115 to dispatch specific resources via dispatch module 415.

Figure 5:
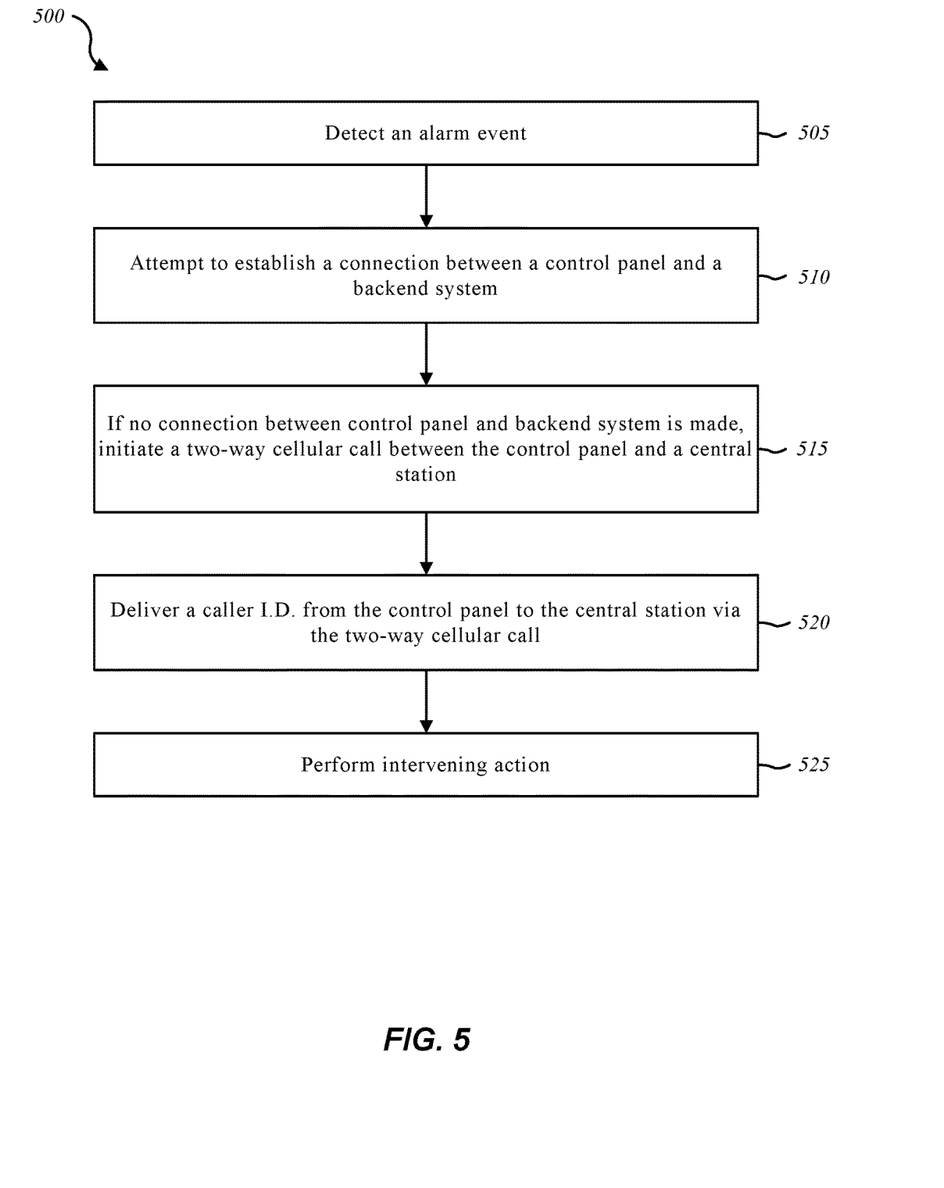
FIG. 5 is a flow diagram illustrating a method for back-end failure redundancy.

FIG. 5 is a flow diagram illustrating one embodiment of a method 500 for backend failure redundancy. In some configurations, the method 500 may be implemented by the communication module 140 of device 105 shown in FIGS. 1 and/or 2. In other examples, method 500 may be performed generally by device 105 shown in FIGS. 1 and/or 2, or even more generally by the environments 100, 200 shown in FIGS. 1 and/or 2, respectively. In some configurations, method 500 may be implemented in conjunction with response module 180 and/or operation of central station 115 generally as described above.

At block 505, an alarm advance may be detected. The alarm event may be detected or determined using, for example, communication module 140 or the alarm module 145 of device 105. At block 510, an attempt is made to establish a connection between a device (e.g., control panel) and a backend system. The connection is typically established over a network such as the first network 120 for connection to a backend system such as backend system 110. At block 515, when it is determined that no connection is possible between the device (e.g., control panel) in the backend system, a two-cellular call is initiated between the device (e.g., control panel) and a central station, such as central station 115.

The inability to create a connection between a control panel and the backend system may be due to problems with the network over which communication is typically provided between the control panel and backend system, or in the backend system itself. Failure of the backend system may initiate a redundant backup procedure in which the two-way cellular call or other type of communication is initiated between the control panel and the central station. The two-way cellular call and/or other communication may be performed over the same or different network as the network typically used for communication between the control panel and backend system.

At block 520, a caller ID is delivered from the control panel to the central station via the two-way cellular call. While a caller ID may be used as a specific example of the type of information delivered from the control panel to the central station, other types of information may be conveyed including, for example, an alarm code, location information, etc.

At block 525, an intervening action is performed in response to the caller ID delivered to the central station. The intervening action may include, for example, outreach to a user of a control panel via, for example, a two-way cellular call, a text or other communication outside of the two-way cellular call used to deliver the caller ID to the central station, or dispatching service or emergency personnel to the location of the control panel.

Figure 6:
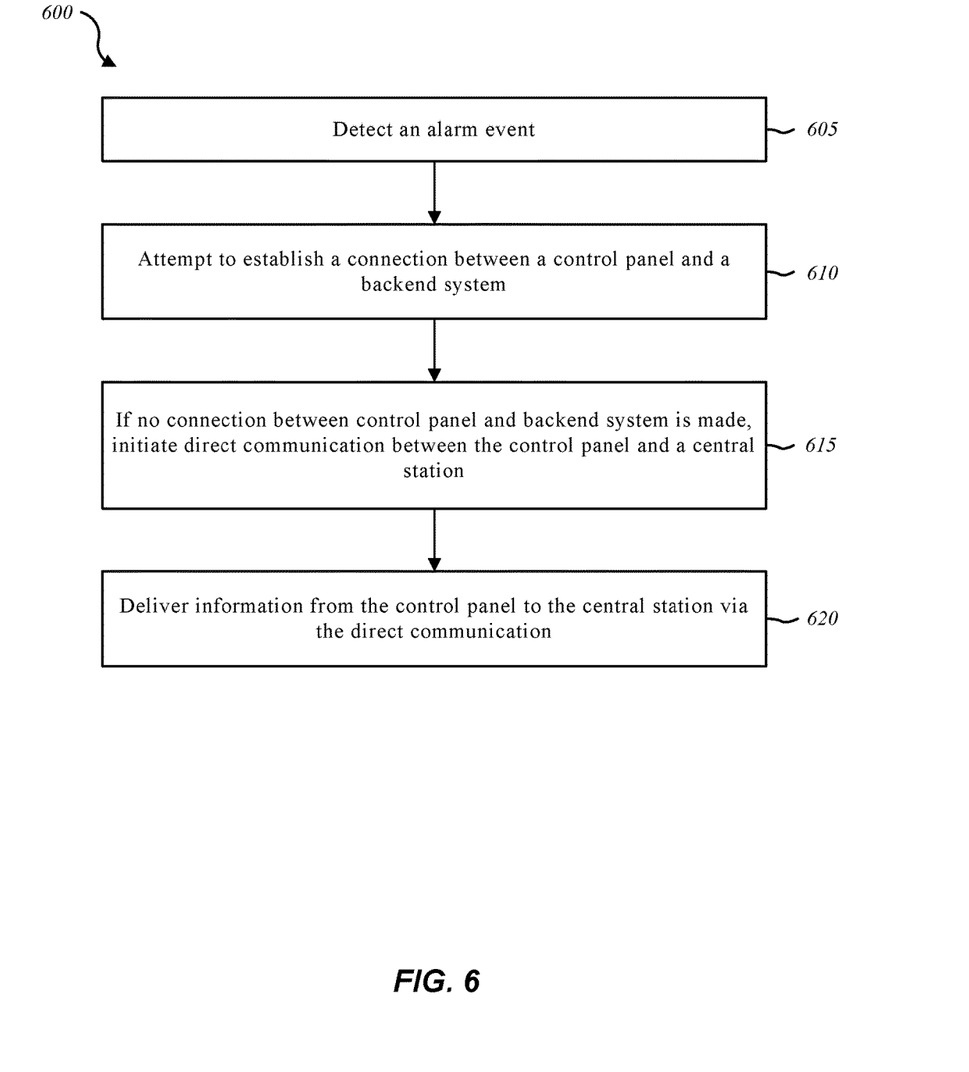
FIG. 6 is a flow diagram illustrating another method for back-end failure redundancy.

FIG. 6 is a flow diagram illustrating one embodiment of a method 600 for backend failure redundancy. In some configurations, the method 600 may be implemented by the communication module 140 described above with reference to FIGS. 1 and 2, or generally the device 105 or environment 100, 200 described above with reference to FIGS. 1 and/or 2.

At block 605, an alarm event is detected. The alarm event may be any of a number of different events or conditions detected by any number of sensors or other feedback mechanisms (e.g., sensor 130 shown in FIG. 2). At block 610, an attempt is made to establish a connection between a control panel and a backend system. The control panel may include or be part of the device 105 described with reference to FIGS. 1 and/or 2. The backend system may be the backend system 110 described in reference to FIGS. 1 and/or 2. The attempt to establish the connection between the control panel and the backend system may be performed via, for example, the first network 120 of FIGS. 1 and/or 2.

At block 615, if no connection between the control panel and backend system is made, a direct communication is initiated between the control panel and a central station. The central station may include the central station 115 of FIGS. 1 and/or 2. The direct communication may be provided via a separate network such as the second network 125 of FIGS. 1 and/or 2. The direct communication may include, for example, a two-way cellular call.

At block 620, information is delivered from the control panel to the central station via the direct communication. The information delivered may include, for example, a caller ID, alarm code, location information, or other information relative to the device 105 or environment 100, 200, generally. Other steps of method 600 may relate to responsive communications from the control station such as, for example, an intervening action (e.g., dispatching services or contacting a user associated with the control panel).

Figure 7:
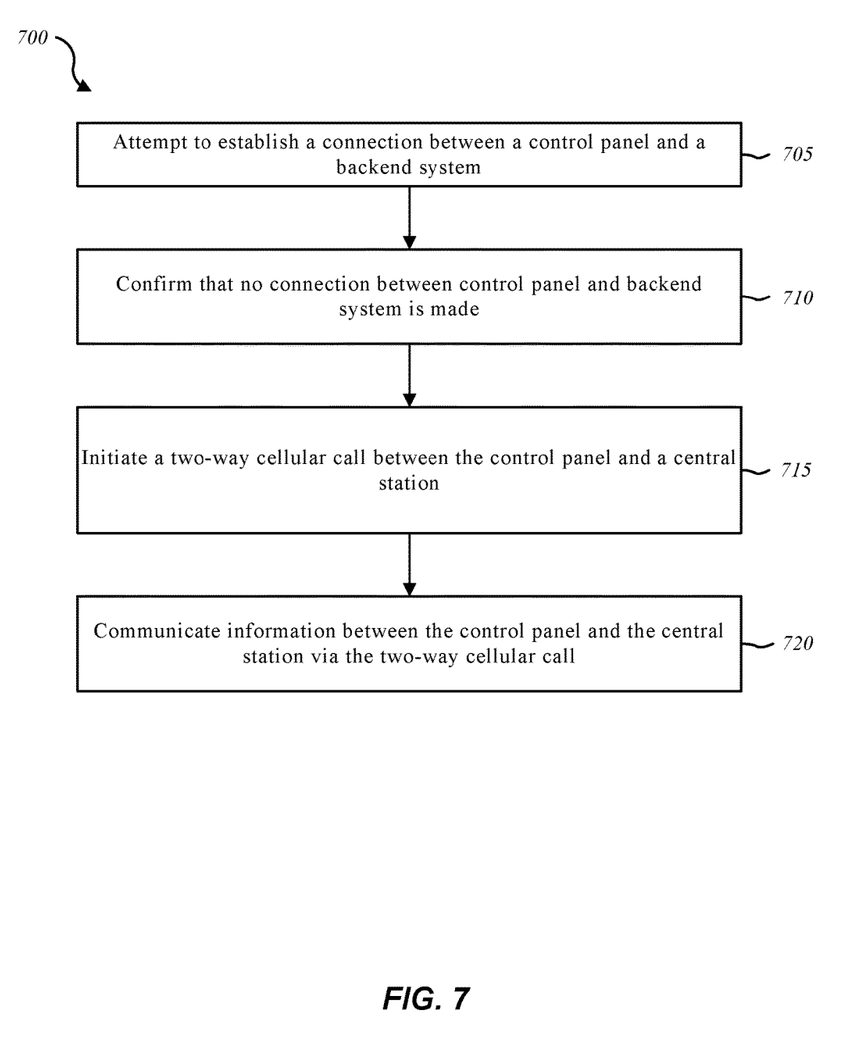
FIG. 7 is a flow diagram illustrating another method for back-end failure redundancy.

FIG. 7 is a flow diagram illustrating one embodiment of a method 700 for backend failure redundancy. In some configurations, the method 700 may be implemented by the communication module 140, device 105, or environment 100, 200, generally, which are described above with reference to FIGS. 1-4.

At block 705, an attempt is made to establish a connection between a control panel and a backend system. The control panel may include all or portions of device 105 described with reference to FIGS. 1 and/or 2. The backend system may be accessible via a network. At block 710, confirmation is made that no connection is available between the control panel and backend system. The failure to connect the control panel the backend system may result from problems with the network or with failures at the backend system.

Block 715 includes initiating a two-cellular call between the control panel and a central station. The two-way cellular call may be made across a different network than the network used to connect the control panel to the backend system. At block 720, information is communicated between a control panel and a central station via the two-way cellular call. The information may include, for example, a caller ID or other information that may be conveyed from the control panel to the central station without requiring two-way communication back from the central station to the control panel. As discussed above, the two-way cellular call initiated in block 715 and used for communicating information in block 720 may be replaced with other types of communication via other types of networks. A two-way cellular call may have particular relevance in the applications described herein because of the ease and relatively low cost of including a cellular radio in the control panel (e.g., device 105) and at the central station. The cellular radio may provide an alternative means of communicating information from the control panel to the central station by bypassing the typical lines of communication between the device and backend system and between the backend system and the central station.

The cellular radio may provide an entirely separate network or line of communication to better ensure that the backend failure redundancy does not fail for the same or similar reasons as the communication failure between the device and the backend system.

Figure 8:
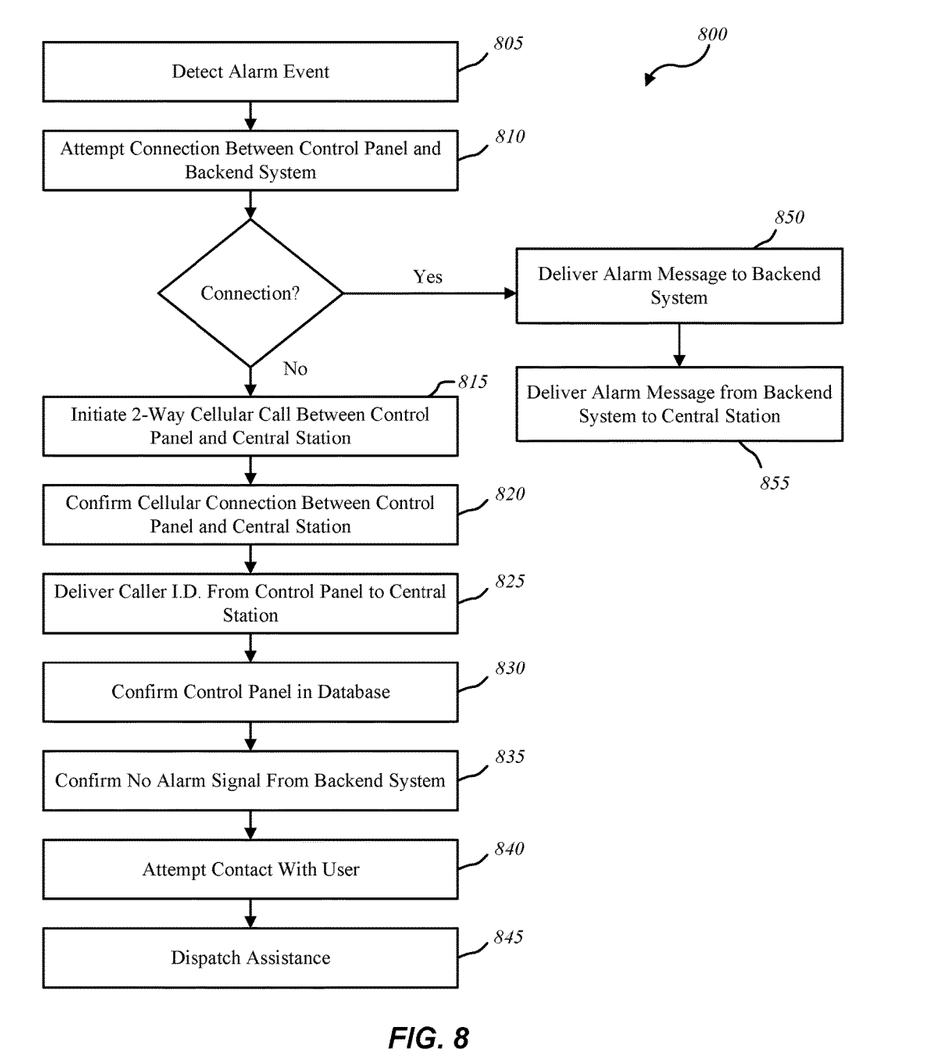
FIG. 8 is a flow diagram illustrating another method for back-end failure redundancy.

FIG. 8 is a flow diagram illustrating one embodiment of a method 800 for backend failure redundancy. In some configurations, the method 800 may be implemented by the communication module 140, device 105, or environment 100, 200 described above with reference to FIGS. 1-4.

At block 805, an alarm event is detected. The alarm event may be any of a number of different events or circumstances associated with an environment (e.g., environment 100, 200). The alarm event may be detected at least in part by a sensor such as sensor 130 described with reference to FIGS. 1 and/or 2.

At block 810, an attempt is made to connect the control panel to a backend system. If the connection is made, an alarm message is delivered to the backend system at block 850. At block 855, an alarm message is delivered from the backend system to a central station. Thereafter, the central station may perform an intervening action such as dispatching service for emergency personnel, or contacting a user of the control panel.

If the connection between the control panel and backend system is not made, block 815 shows that a two-way cellular call is initiated between the control panel and the central station. This separate communication effectively bypasses communications typically routed through the backend system as described with reference to blocks 850 and 855. The two-way cellular call is just one of numerous examples of the type of communication that may be possible between the control panel and the central station, and does not limit which of these communication mediums may be used.

At block 820, the cellular connection between the control panel and the central station is confirmed. Once confirmation is complete, a caller ID is delivered from the control panel to central station in block 825. Other types of information besides a caller ID may be delivered from the control panel to the central station via the two-way cellular call. Some example types of information include, for example, an alarm code, information about the control panel, and a location of the control panel.

At block 830, confirmation of the control panel in the database is made. This confirmation is used to ensure that the control panel from which the caller ID is received, or the associated monitored property, is part of the network or system that is being monitored by the central station. At block 835, confirmation is made that no alarm signal has been received from the backend system. If a separate alarm signal is received from the backend system for a particular control panel, a different protocol or operating procedure may be initiated to deal with such a situation of conflicting signals. In the event that no alarm signal has been received from the backend system, a method 800 may proceed to additional operating steps.

At block 840, an attempt is made to contact the user of the control panel, some other authorized person associated with the control panel, and/or the property associated with the control panel. The attempted contact may be made using, for example, a two-cellular call, text, email, or contact via social media. If communication is initiated with the user, an inquiry may be made concerning why or how the caller ID specifically and/or the other information received directly from the control panel occurred.

At block 845, assistance may be dispatched in response to the received information from the control panel. The assistance may be in the form of, for example, service personnel or emergency services.

Alternative methods may relate specifically to operating procedures for the control panel. The control panel may have a certain operating procedure in the event that information is received from the backend system related to an alarm event. A separate operating procedure may be used when a signal is received directly from the control panel. Various steps may be taken to confirm that the signal or information received directly from the control panel is accurate. Upon receiving a signal directly from the control panel, further steps may be taken to initiate checks on the backend system and/or the network used to communicate between the control panel and the backend system. Typically, no signal is received directly from the control panel to the central station unless a failure has occurred at the backend system or the network used to communicate between the backend system and the control panel.

Figure 9:
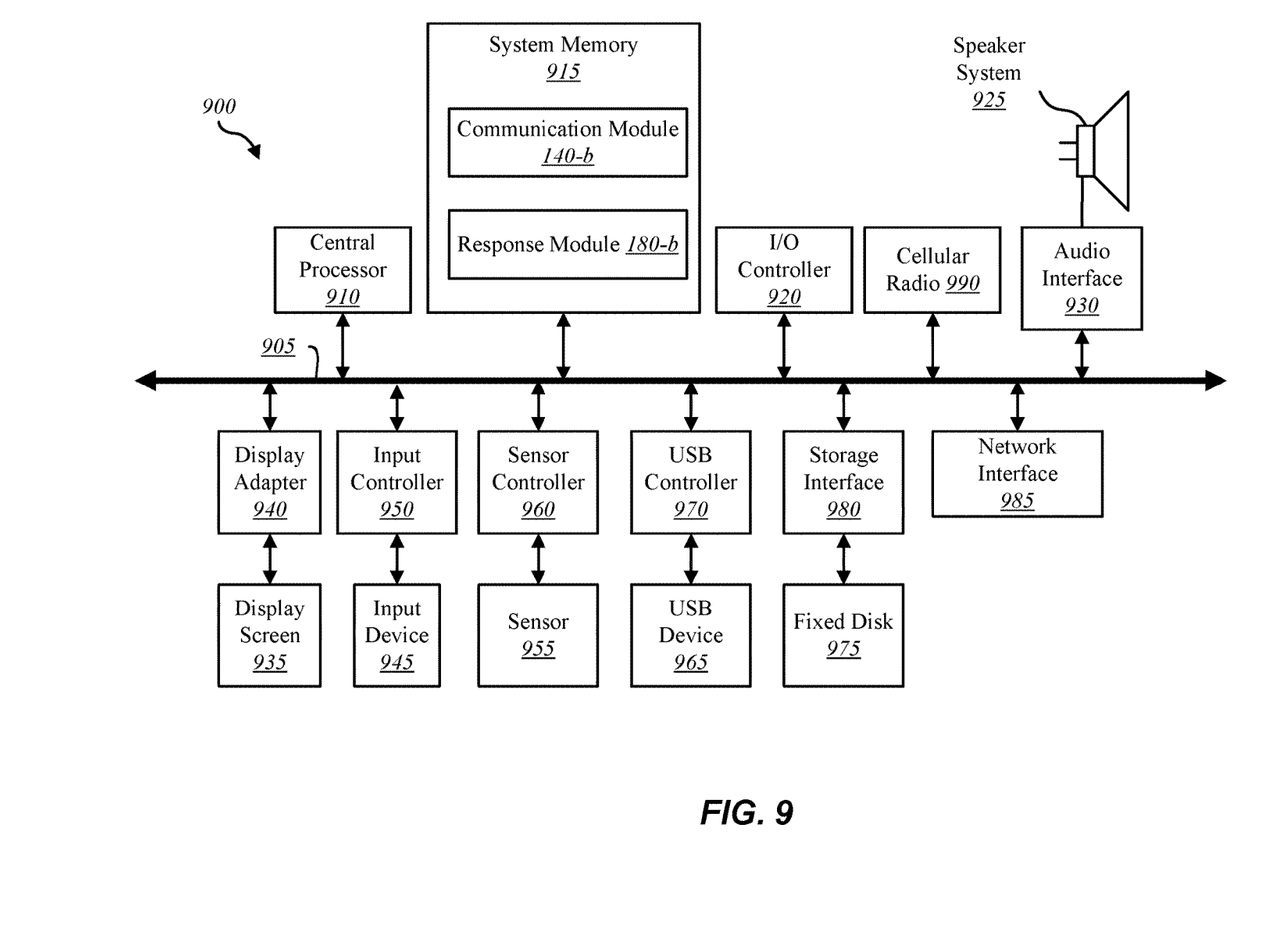
FIG. 9 is a block diagram of a computer system suitable for implementing the present systems and methods of FIGS. 1 and 2.

FIG. 9 depicts a block diagram of a controller 900 suitable for implementing the present systems and methods. The controller 900 may be an example of the device 105, mobile computing device 155, and/or home automation controller 160 illustrated in FIG. 1. In one configuration, controller 900 includes a bus 905 which interconnects major subsystems of controller 900, such as a central processor 915, a system memory 920 (typically RAM, but which may also include ROM, flash RAM, or the like), an input/output controller 925, an external audio device, such as a speaker system 930 via an audio output interface 935, an external device, such as a display screen 935 via display adapter 940, an input device 945 (e.g., remote control device interfaced with an input controller 950), multiple USB devices 965 (interfaced with a USB controller 970), one or more cellular radios 990, and a storage interface 980. Also included are at least one sensor 955 connected to bus 905 through a sensor controller 960 and a network interface 985 (coupled directly to bus 905).

Bus 905 allows data communication between central processor 915 and system memory 920, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a communication module 140-b or a response module 180-b to implement the present systems and methods may be stored within the system memory 920. The communication module 140-b may be an example of the communication module 140 illustrated in FIGS. 1, 2, and/or 3. The response module 180-b may be an example of the response module 180 illustrated in FIGS. 1, 2, and/or 4. Applications (e.g., application 150) resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985. In one configuration, the cellular radio 990 may include a receiver and transmitter to wirelessly receive and transmit communications via, for example, a cellular network. The cellular radio 990 may be used to transmit information to the central station 115 via the second network 125.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 920 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks.

Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A control panel comprising:
    a processor;
    a memory in electronic communication with the processor; and
    instructions stored in the memory, the instructions being executable by the processor to:
    detect an alarm event;
    attempt to establish a connection over a first network with a backend system;
    if no connection with the backend system is made, initiate a communications link over a second network distinct from the first network, wherein the communication link comprises a two-way cellular call; and
    deliver information via the communications link, wherein the information is associated with the alarm event and comprises a caller identification (ID).

2. The method of claim 1, wherein the caller ID identifies the control panel.

3. The method of claim 2, wherein the control panel includes a cellular radio designated for the control panel, and the caller ID is associated with the cellular radio.

4. The method of claim 1, wherein the information comprises an alarm code.

5. The method of claim 1, wherein the delivering is being based at least in part on the detecting the alarm event, and the information is associated with the alarm event based at least in part on the delivering.

6. The method of claim 1, wherein the information is associated with a geographic location of the control panel.

7. The method of claim 6, wherein the information comprises a residential address.

8. The method of claim 1, wherein the first network includes the Internet.

9. A computer-implemented method at a control panel, comprising:
    detecting an alarm event;
    attempting to establish a connection over a first network with a backend system;
    if no connection with the backend system is made, initiating a communications link over a second network distinct from the first network, wherein the communication link comprises a two-way cellular call; and
    delivering information via the communications link, wherein the information is associated with the alarm event and comprises a caller identification (ID), and wherein the caller ID identifies the control panel.

10. The method of claim 9,
    wherein the control panel includes a cellular radio designated for the control panel, and the caller ID is associated with the cellular radio.

11. The method of claim 9,
    wherein the information comprises an alarm code.

12. The method of claim 9
    wherein the delivering is being based at least in part on the detecting the alarm event, and the information is associated with the alarm event based at least in part on the delivering.

13. The method of claim 9, wherein the information is associated with a geographic location of the control panel.

14. The method of claim 13, wherein the information comprises a residential address.

15. The method of claim 9, wherein the first network includes the Internet.

16. A computer-program product for back-end failure redundancy, the computer-program product comprising a non-transitory computer-readable medium storing instructions executable by a processor to:
- detect an alarm event;
- attempt to establish a connection over a first network with a backend system;
- if no connection with the backend system is made, initiate a communications link over a second network distinct from the first network, wherein the communication link comprises a two-way cellular call; and
- deliver information via the communications link, wherein the information is associated with the alarm event and comprises a caller identification (ID), and wherein the caller ID identifies a control panel.

17. The computer-program product of claim 16, wherein the control panel includes a cellular radio designated for the control panel, and the caller ID is associated with the cellular radio.

18. The computer program product of claim 16, wherein the information comprises an alarm code.

19. The method of claim 16, wherein the instructions are further executable by the processor to perform the delivering based at least in part on the detecting the alarm event, and wherein the information is associated with the alarm event based at least in part on the delivering.

20. The computer program product of claim 16, wherein the information is associated with a geographic location of the control panel.

* * * * *